(12) United States Patent
Teufel et al.

(10) Patent No.: US 8,998,332 B2
(45) Date of Patent: Apr. 7, 2015

(54) LOCKING DEVICE FOR A FOLD-OVER BACKREST OF A SEAT

(75) Inventors: Ingo Teufel, Rockenhausen (DE); Peter Reimer, Ramsen (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 54 days.

(21) Appl. No.: 13/990,935

(22) PCT Filed: Feb. 8, 2012

(86) PCT No.: PCT/EP2012/000566
§ 371 (c)(1),
(2), (4) Date: Aug. 1, 2013

(87) PCT Pub. No.: WO2012/110211
PCT Pub. Date: Aug. 23, 2012

(65) Prior Publication Data
US 2013/0312466 A1    Nov. 28, 2013

(30) Foreign Application Priority Data
Feb. 16, 2011    (DE) .......................... 10 2011 011 570

(51) Int. Cl.
*B60N 2/02*    (2006.01)
*B60N 2/44*    (2006.01)
(Continued)

(52) U.S. Cl.
CPC .......... *B60N 2/4435* (2013.01); *B60N 2/01516* (2013.01); *B60N 2/366* (2013.01)

(58) Field of Classification Search
USPC ..................... 297/378.13, 378.12; 296/65.1
See application file for complete search history.

(56) References Cited

U.S. PATENT DOCUMENTS

| 4,813,722 A | 3/1989 | Viscome et al. |
| 5,700,056 A * | 12/1997 | Bernard .................... 297/378.13 |
| 5,855,414 A * | 1/1999 | Daniel et al. ............. 297/378.13 |

(Continued)

FOREIGN PATENT DOCUMENTS

| DE | 199 16 223 C1 | 2/2001 |
| DE | 101 46 528 A1 | 4/2003 |

(Continued)

OTHER PUBLICATIONS

Notification of Transmittal of Translation of the International Preliminary Report on Patentability mailed Aug. 29, 2013, as received in corresponding International Patent Application No. PCT/EP2012/000566.

(Continued)

*Primary Examiner* — Laurie Cranmer
(74) *Attorney, Agent, or Firm* — Foley & Lardner LLP

(57) ABSTRACT

A locking device for a fold-over backrest of a seat, has a locking housing in which a handle is pivotable between a locked position and an unlocked position, by which handle a pawl of a locking mechanism can be carried between a locked position and an unlocked position. A blocking bolt is movable manually by a closable lock between a blocked position blocking the handle and a released position releasing the handle. A transmission element is driveable displaceably in a guide from a first end position into a second end position. The transmission element has a retaining element and, upon movement of the handle out of the locked position, is movable into a retaining recess of the blocking bolt and prevents the blocking bolt from being able to move from the released position into the blocked position.

10 Claims, 5 Drawing Sheets

Figure 1:
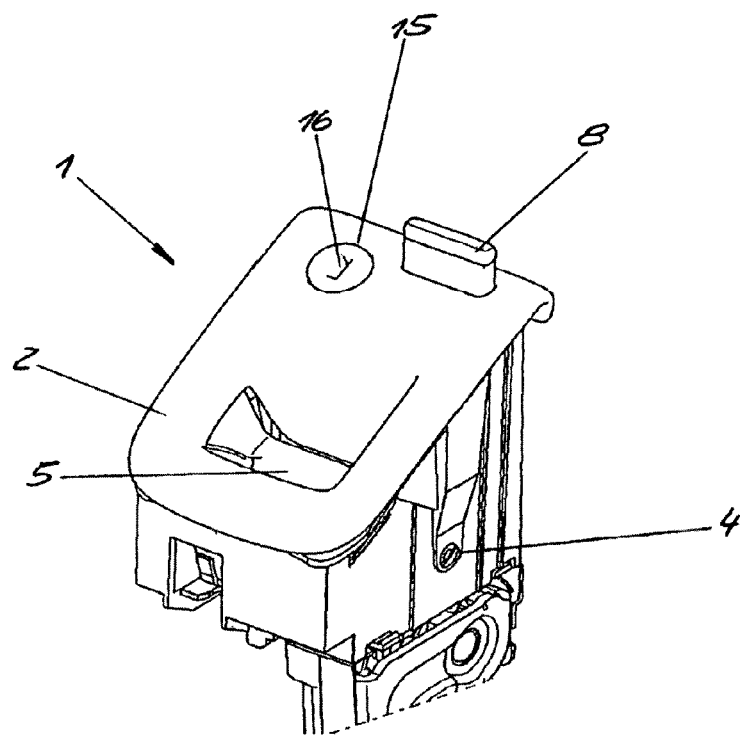

(51) Int. Cl.
*B60N 2/015* (2006.01)
*B60N 2/36* (2006.01)

(56) References Cited

U.S. PATENT DOCUMENTS 6,139,076 A * 10/2000 Hara et al. ............... 292/336.3
7,226,129 B2 * 6/2007 Brandes et al. .......... 297/378.13

FOREIGN PATENT DOCUMENTS

DE  10 2008 033 304 A1  1/2010
WO  WO-2010/003587  1/2010

OTHER PUBLICATIONS

International Search Report in PCT/EP2012/000566 dated May 7, 2012.

* cited by examiner

LOCKING DEVICE FOR A FOLD-OVER BACKREST OF A SEAT

CROSS REFERENCE TO RELATED APPLICATIONS

The present application is a National Stage of International Application No. PCT/EP2012/000566 filed on Feb. 8, 2012, which claims the benefit of German Patent Application No. 10 2011 011 570.6 filed on Feb. 16, 2011, the entire disclosures of which are incorporated herein by reference.

The invention relates to a locking device for a fold-over backrest of a seat, in particular a rear seat in a motor vehicle, comprising a locking housing in which a handle which is able to be pivoted about a pivot axis between a locked position and an unlocked position is arranged, by means of which handle a locking pawl of a locking mechanism is able to be driven between a locked position and an unlocked position, comprising a blocking bolt which is able to move manually by means of a closable lock between a blocked position blocking the handle in the locked position thereof and a released position releasing the handle.

PRIOR ART

A generic locking device is disclosed in U.S. Pat. No. 4,813,722, in which it is not possible to pivot the handle in the closed state.

A closable locking device is disclosed in DE 101 46 528 A1 in which it is possible to pivot the handle in the closed state without resulting in the locking pawl being driven. A similar locking mechanism is disclosed in DE 199 16 223 C1.

In such locking mechanisms there is the drawback that the blocking bolt is able to be moved by the lock into the blocked position thereof even when the locking pawl is in the unlocked position. As a result, a correct movement of the locking pawl into the locked position thereof is hindered or even completely prevented.

OBJECT OF THE INVENTION

It is the object of the invention to provide a locking device of the type mentioned in the introduction which does not permit the locking mechanism to be closed when the locking pawl is in the unlocked position.

SOLUTION

This object is achieved according to the invention in association with the features of the preamble of claim 1, in that by means of the handle, when moved from the locked position into the unlocked position, a transmission element is able to be displaceably driven in a guide from a first end position into a second end position, wherein the transmission element has a locking element fixedly arranged thereon which, when the handle is moved from the locked position thereof, is able to be moved into a locking recess of the blocking bolt and blocks the ability of the blocking bolt to move from the released position thereof into the blocked position thereof.

By means of this design, by a movement of the handle from the locked position thereof, not only is the locking pawl moved into the unlocked position thereof but at the same time the blocking bolt is locked in the released position thereof, so that the blocking bolt is not able to hinder or even prevent the free mobility of the handle.

Only when the handle is again in the locked position thereof is the blocking bolt released again and able to be moved into the blocked position thereof blocking the handle.

In a simple design, the locking recess may be a locking groove extending transversely to the direction of movement of the blocking bolt.

In a similarly simple design, the locking element is configured as a locking projection which protrudes from the transmission element transversely to the direction of movement of the transmission element.

In such a design, the locking projection of the transmission element is able to move into the locking groove of the blocking bolt, transversely to the direction of movement of the blocking bolt, from an unlocked position of the bolt into a locked position of the bolt.

In a dual function and thus saving components, mounting cost and constructional space, an indicating tab may be arranged on the transmission element, said indicating Lab being able to be displaceably driven by the movement of the transmission element between a non-indicating position retracted into the guide and an indicating position outwardly protruding partially from the guide and from the locking housing.

In a passenger motor vehicle with a fold-over backrest, the indicating tab visible in the indicating position thereof serves to indicate that the locking device thereof is not correctly latched and, as a result, that there is the risk of the backrest folding forward when the vehicle decelerates during the operation of the vehicle, in particular during braking.

If, when the handle is in the locked position, the indicating tab is able to move counter to a spring force into its non-indicating position by its outer end region protruding from the guide being subjected to force, the indicating tab is able to be retracted into the locking housing by subjecting the indicating tab, which is in its indicating position, to force.

In a simple embodiment, the blocking bolt may be displaceably guided in a bolt guide of the locking housing.

If the blocking bolt has a bolt groove oriented transversely to its direction of movement, into which a lock pin of the lock protrudes, said lock pin being pivotable by means of a key about a lock axis extending transversely to the direction of movement of the blocking bolt, by rotating the key by for example 90° the lock pin is pivoted and the blocking bolt is displaced between the released position thereof and the blocked position thereof.

For blocking the handle, in a simple design, the handle may have a blocking recess oriented transversely to the direction of movement of the blocking bolt, into which the blocking bolt engages in the blocked position thereof with a blocking pin of the same cross section.

If the backrest forms a partition between a passenger compartment and a luggage space of the motor vehicle, when the backrest is in the position of use and the locking mechanism is locked, said backrest position may be locked by the lock. It is then not possible to reach the luggage space via the passenger compartment.

FIGURES AND EMBODIMENTS OF THE INVENTION

Figure 2:
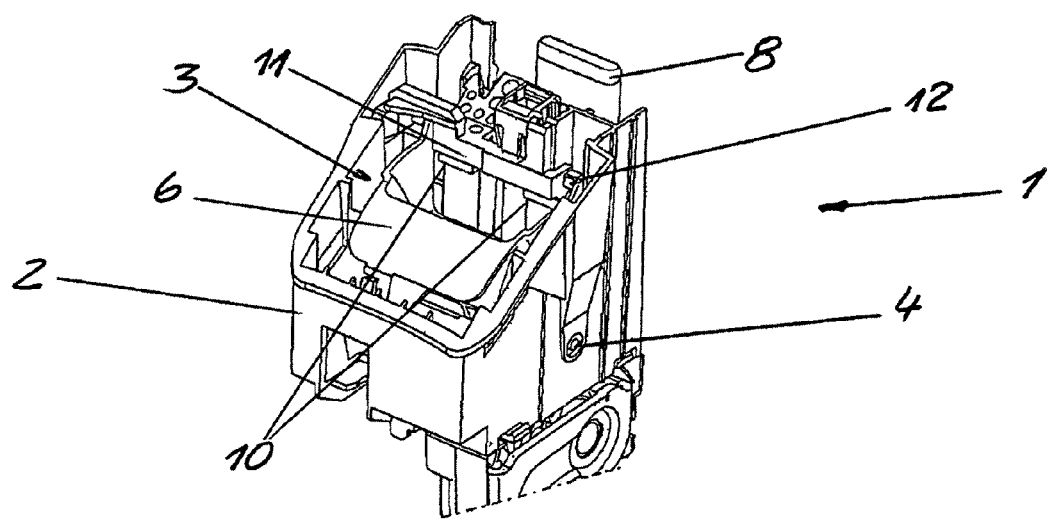
Figure 3:
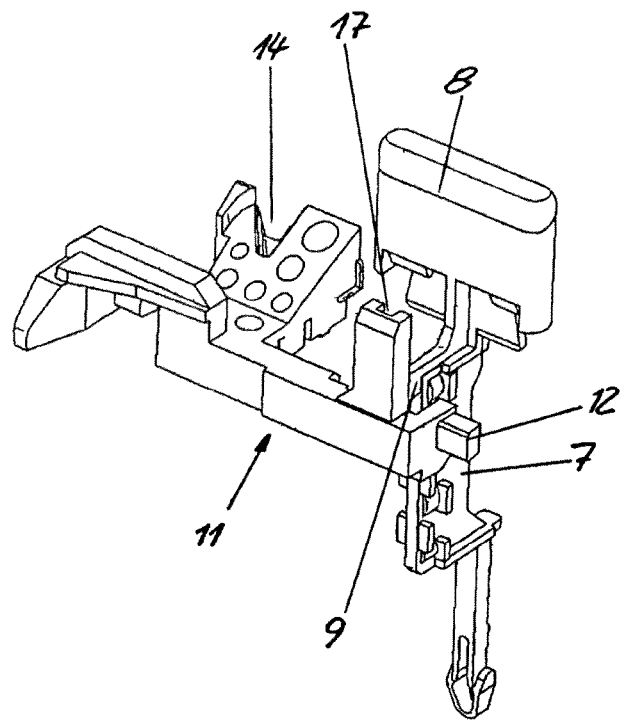
Figure 4:
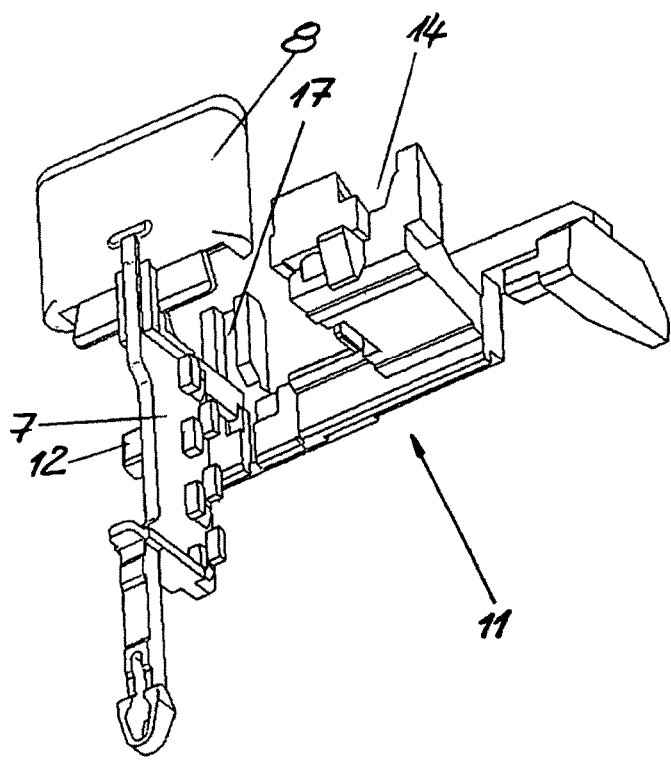
Figure 5:
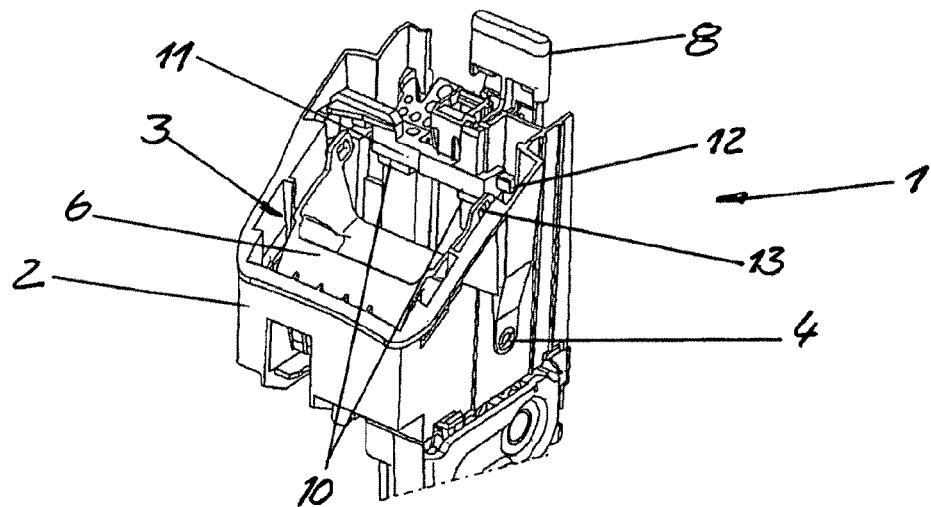
Figure 6:
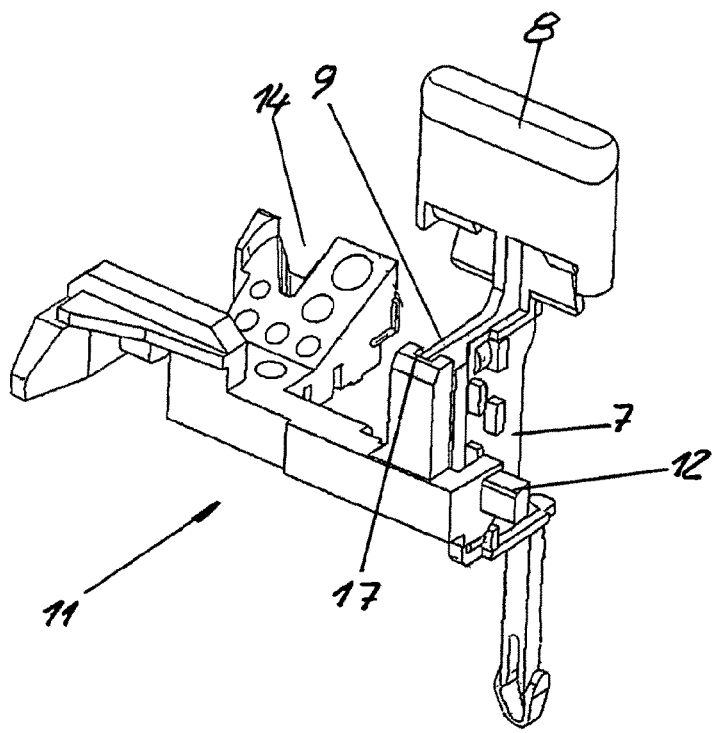
Figure 7:
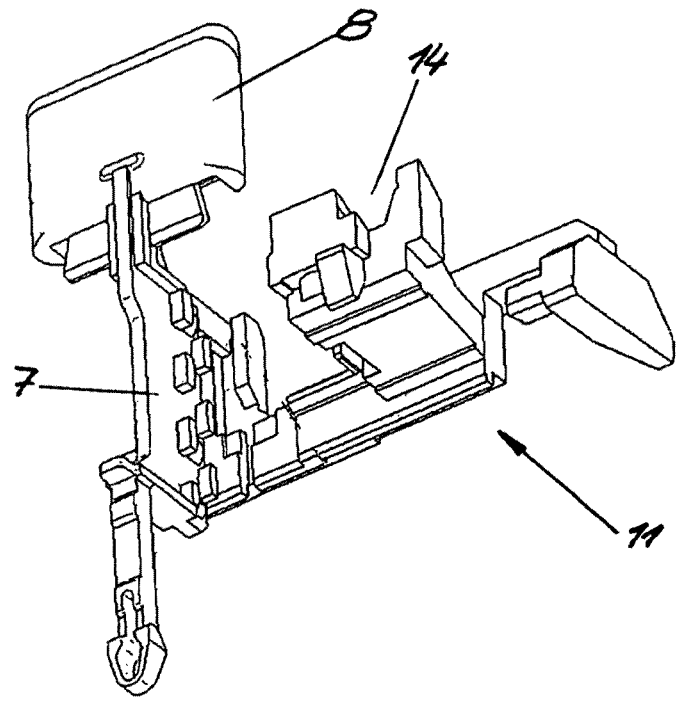
Figure 8:
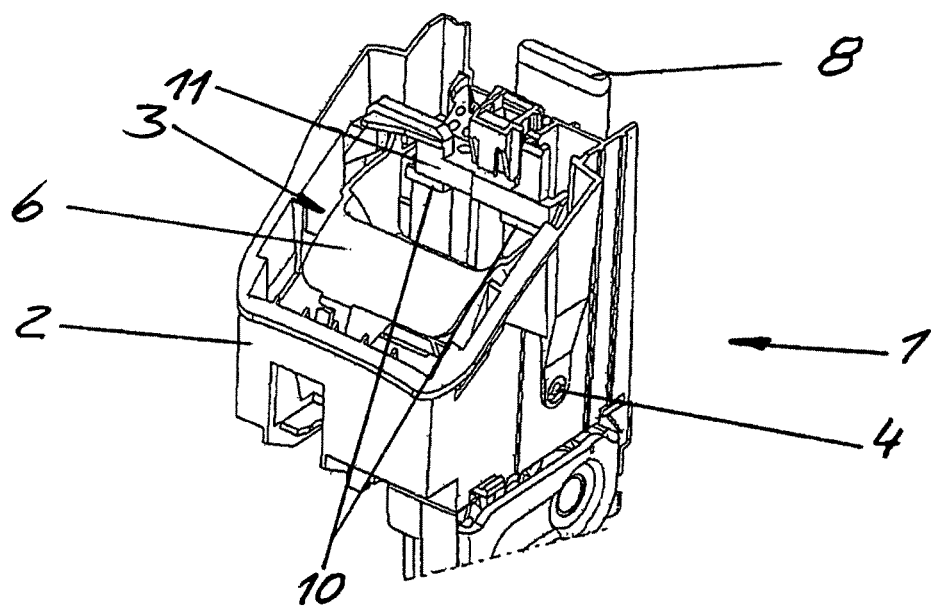
Figure 9:
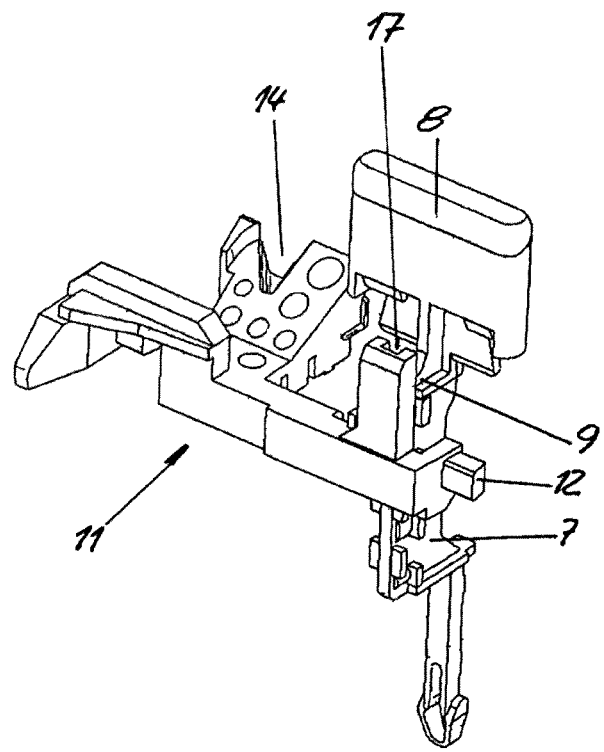
Figure 10:
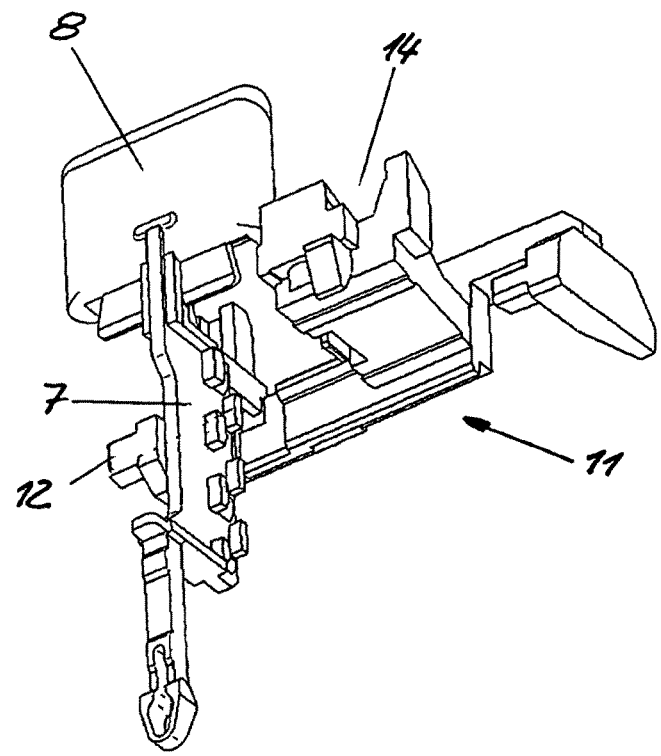

The invention is described in more detail hereinafter with reference to an advantageous exemplary embodiment, shown in the drawings. The invention is not limited, however, to this exemplary embodiment. In the drawings:

FIG. 1 shows a perspective view of a closed actuating unit of a locking unit with a handle in the unlocked position, FIG. 2 shows a perspective view of the open actuating unit according to FIG. 1 with the handle in the locked position, not closed, FIG. 3 shows a perspective view of the blocking bolt and the transmission element according to the position in FIG. 2, FIG. 4 shows a view according to FIG. 3 in a further perspective, FIG. 5 shows a perspective view of the open actuating unit according to FIG. 1 with the handle in the unlocked position, not closed, FIG. 6 shows a perspective view of the blocking bolt and the transmission element according to the position in FIG. 5, FIG. 7 shows a view according to FIG. 6 in a different perspective, FIG. 8 shows a perspective view of the open actuating unit according to FIG. 1 with the handle in the locked position, closed, FIG. 9 shows a perspective view of the blocking bolt and the transmission element according to the position in FIG. 8 and FIG. 10 shows a view according to FIG. 9 in a different perspective.

The locking device shown in the figures has an actuating unit 1 with a locking housing 2. Below the actuating unit 1 the locking device has a locking mechanism of the known type. Said locking mechanism comprises an entry slot open at the edge, through which a locking bolt arranged fixedly on a body part of a motor vehicle may be inserted transversely.

A rotary catch, not shown, is able to be pivotably mounted in a bearing bore, through which the locking bolt inserted into the entry slot is captured in the locked position of the rotary catch.

For securing the rotary catch in the locked position, the rotary catch has an approximately radially protruding projection which in the locked position of the rotary catch may be engaged from behind by a locking hook of a locking pawl.

The locking pawl is able to be pivoted in the locking housing half about a pivot axis between a locked position and an unlocked position.

One end of a connecting rod is pivotably articulated to the locking pawl about a first axis parallel to the pivot axis, the other end thereof being pivotably articulated to a handle 3 about a second axis.

A generic locking mechanism is, for example, disclosed in WO 2010/003587 A1, the relevant disclosure thereof being expressly referred to.

The handle 3 is pivotably mounted in the locking housing 2 connected to the actuating unit 1, about a second pivot axis 4 parallel to the second axis, and has a grip 6 protruding outwardly through an opening 5 of the locking housing 2, by means of which the handle 3 is able to be pivoted manually between a locked position and an unlocked position, wherein the locking pawl is able to be pivoted between the locked position and the unlocked position.

At a radial distance from the second pivot axis 4 to the left, a two-arm lever, not shown, is pivotably mounted about a lever axis parallel to the second pivot axis.

The lever has a first arm which, at a distance from the lever axis, has a convex-like bearing surface which bears against a contact surface of the handle, similarly configured in a convex-like manner.

A second arm of the lever protrudes on the right-hand side of the handle 3 and has at its free end an adjusting surface which is oriented upwards.

In a vertical guide of the locking housing 2, a transmission element 7 is arranged displaceably guided between a first end position and a second end position.

The transmission element 7 has an indicating tab 8 which in the non-indicating position is inserted with the transmission element 7 substantially in the guide into the locking housing 2, and in the indicating position is withdrawn to protrude upwardly from the locking housing 2.

The indicating tab 8 is in its non-indicating position when the handle 3 is in its locked position and when the transmission element 7 is in its first end position. If the handle 3 is in its unlocked position, this is indicated by the indicating tab 8 in its indicating position, wherein the transmission element 7 is in its second end position.

The transmission element 7 also has a locking element which is configured as a locking projection 9 which protrudes from said transmission element transversely to the direction of movement of the transmission element 7.

A bolt guide 10 is formed on the locking housing 2, in which bolt guide a blocking bolt 11 is displaceably guided transversely to the direction of movement of the transmission element 7 between a blocked position and a released position.

The blocking bolt 11 has at one end thereof a blocking pin 12 of approximately the same cross section as a blocking recess 13 in the handle 3.

In the locked position of the handle 3, the blocking pin 12 in the direction of movement of the blocking bolt 11 is located opposite the blocking recess 13 so that when the blocking bolt 11 is displaced from the released position thereof into the blocked position thereof the blocking pin 12 comes into engagement in the blocking recess 13 and blocks the handle 3 in the locked position thereof.

To displace the blocking bolt 11 in its adjusting guide 10, the blocking bolt 11 has a bolt groove 14 which opens outwardly transversely to its direction of movement. A lock pin, not shown, protrudes with its free end into the bolt groove 14, said lock pin being pivotably mounted at its other end about a lock axis.

A lock 15 is arranged in the locking housing 2, which lock has a lock slot 16 for inserting a key and on which the aforementioned lock pin is arranged. By rotating the key by 90°, the lock pin is also pivoted by 90°.

Depending on the direction of rotation, the blocking bolt 11 is thereby displaced into the blocked position thereof and/or the released position thereof.

The blocking bolt 11 also has a locking groove 17 as a locking recess which extends transversely to the direct of movement of the blocking bolt 11 and is open in its direction of extent and to the side of the transmission element 7. The locking groove 17 extends in the direction of movement of the transmission element 7 and in the direction of movement of the locking projection 9.

If the blocking bolt 11 is in the released position thereof, the locking groove 17 and the locking projection 9 are aligned with one another.

In this case, the handle 3 may be moved between the locked position thereof and the unlocked position thereof.

By a movement of the handle 3 from the locked position into the unlocked position, the transmission element 7 moves from the first end position into the second end position. In this case, the locking projection 9 of the transmission element 7 penetrates into the locking groove 17 transversely to the direction of movement of the blocking bolt 11 and thereby locks the blocking bolt 11 against a movement from the released position thereof into the blocked position thereof.

Only when the handle 3 is again moved completely out of the unlocked position thereof into the locked position thereof is the locking projection 9 no longer located in the locking groove 17 so that the blocking bolt 11 is able to be displaced by rotating the key and pivoting the lock pin.

LIST OF REFERENCE NUMERALS

1 Actuating unit
2 Locking housing
3 Handle
4 Pivot axis
5 Opening
6 Grip
7 Transmission element
8 Indicating tab
9 Locking projection
10 Bolt guide
11 Blocking bolt
12 Blocking pin
13 Blocking recess
14 Bolt groove
15 Lock
16 Lock slot
17 Locking groove

The invention claimed is:

1. A locking device for a fold-over backrest of a seat, comprising:
   a locking housing;
   a handle arranged in the locking housing and which is able to be pivoted about a pivot axis between a locked position and an unlocked position; and
   a locking pawl of a locking mechanism that is able to be driven between a locked position and an unlocked position, comprising a blocking bolt which is able to move manually by means of a closable lock between a blocked position blocking the handle in the locked position thereof and a released position releasing the handle,
   wherein the handle, when moved from the locked position into the unlocked position, displaceably drives a transmission element in a guide from a first end position into a second end position,
   wherein the transmission element has a locking element fixedly arranged thereon and which, when the handle is moved from the locked position thereof, is able to be moved into a locking recess of the blocking bolt and blocks the ability of the blocking bolt to move from the released position thereof into the blocked position thereof.

2. The locking device as claimed in claim 1, wherein the locking recess is a locking groove extending transversely to the direction of movement of the blocking bolt.

3. The locking device as claimed in claim 2, wherein the locking element is configured as a locking projection which protrudes from the transmission element, transversely to the direction of movement of the transmission element.

4. The locking device as claimed in claim 3, wherein the locking projection of the transmission element is able to move into the locking groove of the blocking bolt, transversely to the direction of movement of the blocking bolt, from an unlocked position of the bolt into a locked position of the bolt.

5. The locking device as claimed in claim 1, wherein an indicating tab is arranged on the transmission element, said indicating tab being able to be displaceably driven by the movement of the transmission element between a non-indicating position retracted into the guide and an indicating position outwardly protruding partially from the guide and from the locking housing.

6. The locking device as claimed in claim 5, wherein, when the handle is in the locked position, the indicating tab is able to move counter to a spring force into its non-indicating position by its outer end region protruding from the guide being subjected to force.

7. The locking device as claimed in claim 1, wherein the blocking bolt is displaceably guided in a bolt guide of the locking housing.

8. The locking device as claimed in claim 1, wherein the blocking bolt has a bolt groove oriented transversely to its direction of movement, into which a lock pin of the lock protrudes, said lock pin being pivotable by means of a key about a lock axis extending transversely to the direction of movement of the blocking bolt.

9. The locking device as claimed in claim 1, wherein the handle has a blocking recess oriented transversely to the direction of movement of the blocking bolt, into which the blocking bolt engages in the blocked position thereof with a blocking pin of the same cross section.

10. The locking device as claimed in claim 1, wherein the backrest forms a partition between a passenger compartment and a luggage space of the motor vehicle.

* * * * *